United States Patent Office 3,390,105
Patented June 25, 1968

3,390,105
METHOD OF MAKING A CROSSLINKED POLYMER FOAM AND PRODUCT OBTAINED THEREFROM
Joseph A. Verdol, Dolton, Ill., assignor to Sinclair Research, Inc., New York, N.Y., a corporation of Delaware
No Drawing. Filed Sept. 20, 1963, Ser. No. 310,492
23 Claims. (Cl. 260—2.5)

ABSTRACT OF THE DISCLOSURE

This invention is a method for production of foamed solid synthetic resin compositions and the foam of improved dimensional stability produced thereby. In the process a tertiary alkoxyalkyl component of the feedstock is decomposed. The decomposition produces tertiary olefin gas which serves as a blowing agent and also free hydroxyl groups suitable for cross-linking. The resulting polymer foams are of improved solvent resistance and thermal stability, derived, to some extent at least, from being cross-linked during or subsequent to the foaming process.

---

Foamed polymers, particularly polystyrene foams, have shown an unusually rapid growth rate owing to their high efficiency and low cost in applications such as low-temperature insulation, construction, packaging, etc. The growth pattern for polystyrene foams appears great, the foams being widely used because of their extremely low density, low price and superior insulating qualities. In many instances, however, the use of polystyrene foam is limited because of its lack of dimensional stability at high temperatures and because of its susceptibility to attack by hydrocarbon solvents. For example, the upper limit of thermal stability of foamed polystyrene is about 110–115° C. The foam structure collapses above this temperature. Hence, polystyrene foam is suitable as an insulating material for low temperature insulation, but is limited in high temperature insulation applications. Similarly, foamed polystyrene my be used as an insulator in direct contact with water or water vapor, but cannot be employed as an insulating material in the presence of most organic hydrocarbon solvents or oils. Such hydrocarbon materials are invariably present in operations where lubricated mechanical devices, e.g., compressors, pumps, combustion engines, etc., are employed. The present invention provides new economical methods and concepts for preparing unique cross-linked foamed styrene copolymers as well as foamed cross-linked co- and homopolymers derived from other vinyl-type, that is, alphaolefinically unsaturated monomers. Condensation polymers, such as polyesters, polyamides, polyethers, etc., may also be prepared in foam form using the method of this invention. These new copolymer or homopolymer systems display superior physical properties and solvent resistance in comparison with conventional foam or foams produced from other vinyl monomers such as acrylates, methacrylates, vinyl ethers, vinyl chloride, etc., which are usually foamed as thermoplastic or non-crosslinked materials. A properly cured thermosetting foam prepared in accordance with the present invention is usually unattacked by organic solvents and shows thermal and dimensional stability much superior to conventional foamed polystyrene and related foamed vinyl polymers which are thermoplastic rather than thermosetting.

The process of this invention is concerned primarily with the foaming and cross-linking of certain synthetic polymer resins of the addition or condensation polymer types. Depending on the polymer used, the process may or may not employ an extraneous cross-linking agent, an extraneous blowing agent and/or an extraneous catalyst for the cross-linking and/or blowing reaction.

The polymer resin used as a feedstock to the foaming step is, of course, selected with a view to the properties and price desired for the final foam product. In all instances, however, this polymer resin or the cross-linking agent offers hydroxyalkyl sites for cross-linking preferably by a reaction mechanism distinct from the mechanism employed in making the feedstock resin, and/or leading to linking groups distinct from the linkages appearing in the feedstock polymer. For example, when the feedstock resin is an addition polymer such as polyvinyl resin, the cross-linking reaction will usually be a condensation-type reaction such as esterification. When the feedstock resin is a condensation polymer such as an alkyd or other polyester resin, the cross-linking mechanism will generally be a different type of condensation reaction, such as a urethane reaction. The process of this invention is applicable to both types of feedstock resin but its greatest immediate field of applicability is expected to be in the first named situation, since addition polymers such as styrene and vinyl chloride appear to be the most popular materials for use as plastic foams. Thus, the process of this invention will be described primarily in relation to foaming and cross-linking of addition polymers, especially styrene polymers, although it is applicable to various other feedstock resins.

Since, in this invention, both addition and condensation types of polymerization are usually involved it may be well to review the distinction between these two types. Generally, addition polymerization involves the joining of ethylenically unsaturated molecules with the disappearance of double bonds, often double bonds in the alpha position, to produce polyolefin or polyvinyl type resins; condensation polymerizations may involve reaction between acid functionalities and alcohol functionalities to produce polyesters, or between acid functionalities and amino functionalities to produce polyamides. Another type of condensation involves reaction between isocyanates and alcohols to produce urethane linkages, or between two alcohol groups to form an ether linkage. In this invention the feedstock polymer is usually a supplier of hydroxyalkyl groups as sites for cross-linking by the above described mechanisms which involve hydroxyl groups. It is also within the scope of this invention to provide a feedstock resin having groups suitable for reaction with an hydroxyl-supplying cross-linking agent. Cross-linking will generally require supplying to the feedstock polymer a polyfunctional reagent which has the groups required to react at the cross-linking sites provided by the feedstock polymer. Therefore, an extraneous agent is usually supplied for cross-linking; however, where the feedstock polymer provides the hydroxyalkyl group for cross-linking, it may not be necessary to supply an extraneous reagent, but merely to adjust the reaction conditions to promote etherification of the hydroxyls on adjacent feedstock polymer chains, provided that steric factors do not hinder the reaction.

In the process of this invention, either the polymer to be foamed or the cross-linking agent will contain tertiary alkoxyalkyl groups, which, in the foaming reaction, decompose to form tertiary olefin gas which acts as a blowing agent. The decomposition leaves the hydroxyalkyl group to supply cross-linking sites, although not all the available hydroxyls may take part in the cross-linking; some of the hydroxyl remaining unreacted to give certain properties to the ultimate resin foam product. The presentation of long hydroxyalkyl sites for cross-linking is of value in avoiding steric hindrance factors in cross-linking.

In conventional processes for the manufacture of resin foams, an extraneous foaming agent is generally employed. This is an agent which produces suitable amounts of gas for expanding the polymer when the polymer is in a softened plastic or viscous liquid state. For example, hydrocarbons such as butane, neopentane, propane, etc., find use as blowing agents in making styrene foams. $CO_2$ is also used as a foaming agent, generally being produced in-situ from alkali metal carbonates and bicarbonates. In this invention, the tertiaryalkoxy radicals provide a built-in blowing or foaming agent and the method offers a real advantage to the fabricator of foamed resin articles or flat stock. The blowing agent is provided much more cheaply than most known "built-in" blowing agents which generally comprise nitrogen compounds; it can be of lower molecular weight and therefore be more volatile than most known extraneous liquid blowing agents; it is more easily distributed homogeneously than solid blowing agents and does not require the meticulous mixing and handling required with solid blowing agents to avoid premature foaming.

This invention can provide the fabricator of foam objects with a solid resin feedstock mixture ready to be foamed, molded or extruded, without any need for further ingredients. Advantageously the resin feedstock may be supplied in the form of beads, as described in my copending application, Ser. No. 310,474 filed of even date herewith. Furthermore, the method of this invention can provide for a more uniform foaming and/or cross-linking by tying up hydroxyl groups to be exploited in cross-linking with the tertiary olefin blowing agent, thus seeing that the reactive groups do not react prematurely.

As explained above, this invention is applicable to a variety of homo- and copolymer resin systems, some of which are described in my copending application Ser. No. 202,963, filed June 18, 1962 and the above-mentioned Ser. No. 310,474, both of which are incorporated herein by reference. In accordance with a preferred embodiment of the present invention, a copolymer of styrene or other vinyl-type monomer such as ethyl acrylate, vinyl chloride, vinyl acetate, methyl methacrylate, vinyl methyl ethers, acrylonitrile, butadiene or the like with a tertiaryalkoxyalkyl-containing vinyl monomer such as the tertiary butoxyethyl esters of acrylic acid, methacrylic acid, crotonic acid, fumaric acid, maleic anhydride (or acid), itaconic acid or any tertiaryalkoxyalkyl ester of an addition-polymerizable unsaturated carboxylic acid is employed as the feedstock resin. Thus the method is applicable to many foamable polymer systems, especially to those where a component of the final resin foam contains an acid functionality.

The tertiary alkoxy radical is referred to in many of the formulas below as $OR^2$. In this expression, $R^2$ is a monovalent tertiary hydrocarbon, e.g., alkyl, radical of 4 to 10, preferably 4 to 7, carbon atoms. The tertiary radical has its valence bond to the oxygen at the tertiary carbon of the $R^2$ radical. It is usually derived from a tertiary olefin, that is, one having a double bond at a tertiary carbon, and decomposes during the process to produce this olefin and leave a hydroxy functionality on the backbone polymer side chain, or on the extraneous cross-linking agent, or both. This hydroxyl is available to take part in the cross-linking reaction, which often is an esterification or transesterification, as shown, for example, in the following system:

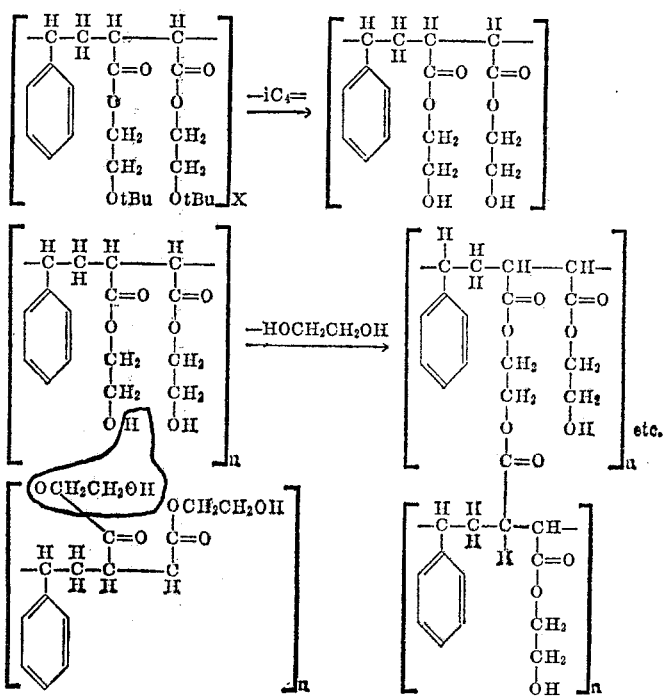

In the case of addition polymers the feedstock resin is usually a hydrocarbon chain of considerable length which may be essentially free of ethylenic and acetylenic unsaturation, that is, all of the carbon-to-carbon linkages in the chain or backbone polymer usually are not less than 1.40 A., the interatomic distance of carbon atoms in a benzene ring. Frequently the backbone will be completely saturated; that is, have no carbon-to-carbon linkage less than 1.54 A., although an occasional olefinic linkage, which has an interatomic distance of 1.34 A. may remain from unreacted starting materials. In condensation polymers the hydrocarbon chains will frequently be interrupted by stable oxygen atoms, as in polyester and polyether resins. Preferred resin feedstocks contain the residue of a tertiaryalkoxyalkyl ester of an unsaturated carboxylic acid. The acid group generally is of about 3–43 carbon atoms. This ester residue usually appears as the repeating group

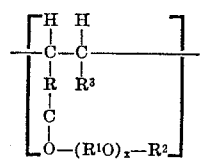

where R is a hydrocarbon radical, preferably unsubstituted. R is of 0–40 or more carbon atoms, preferably 0–20 carbon atoms, aromatic, straight, branched or cyclic aliphatic; it may be saturated or olefinically unsaturated and may be substituted with other materials or radicals which do not interfere with subsequent reactions or the uses of the finished foam. R is generally part of the hydrocarbon residue of a carboxylic acid.

$R^1$ is a divalent aliphatic hydrocarbon radical, for example alkylene, of 2–12, preferably 2–8 carbon atoms. This radical can be saturated, unsaturated, substituted (even with inorganic materials such as silicon or boron), or unsubstituted, straight, branched or cyclic aliphatic. Ordinarily $R^1$ is the hydrocarbon residue of a glycol and for a simple glycol residue the value of $x$ is 1. Where $x$ is a number greater than 1, the radical —($R^1O$)— is the residue of a polyglycol or ether glycol such as polyethylene glycol, etc. Preferably $x$ is 1 to 5 although it may be up to about 25 or more. $R^3$ is a hydrogen or monovalent organic radical, generally hydrocarbon or carboxyl. $R^3$ often is lower alkyl, advantageously of 1 to 4 carbon atoms, but it may have up to 40 or more carbon atoms and be aromatic, straight, branched or cyclic aliphatic, saturated or unsaturated and unsubstituted or substituted with non-deleterious components. $R^3$ also may frequently be another $$-R-\underset{\underset{O}{\|}}{C}-O-(R^1O)_x-R^2$$

or a closely related group. In addition, the H positions or the repeating group may sometimes be occupied by various radicals, especially lower alkyl radicals, say, of 1–4 carbon atoms. The feedstock polymers may be simple homopolymers having the repeating tertiaryalkoxyalkyl (T) group

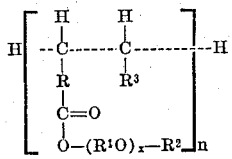

or the polymer may be a copolymer in which the T group is interspersed with other vinyl-type groups, which may sometimes be other tertiaryalkoxyalkyl ($T^1$) groups, or unrelated (U) groups. The copolymer may be of the alternating type, for example —T—U—T—U, or may be a block copolymer, such as

—T—T—T—T—$T^1$—$T^1$—$T^1$—$T^1$—

Graft copolymers, such as

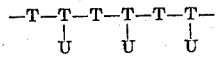

are also foamable and cross-linkable within the scope of this invention. These polymers are usually solids at ambient temperatures and have average molecular weights of about 500 to several million, say, up to about two million or more. Often the polymer will have an average molecular weight of about 100,000 to 500,000.

The T groups are supplied to the polymer feedstock by the tertiaryalkoxyalkyl ester monomer

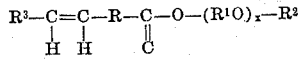

This monomer, in turn, can be made by esterifying the unsaturated carboxylic acid material

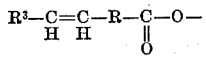

with tertiaryalkoxy-alkanol of the formula $$R_2-(OR_1)_x-OH$$

This acid material may be any suitable material which contains one or more unsaturated carbon bonds and one or more acid functionalities, that is, the "non-oxo carbonylic" (acid, ester, chloride or anhydride) group characterized by the

configuration. Preferably the unsaturation is alpha-monoolefinic. The ester is formed from the acid material and tertiaryalkoxy alkanol by addition and esterification in the case of the anhydride, esterification in the case of the free acid or the chloride, and transesterification in the case of other esters. The tertiary alkoxy-alkanol is generally used in the amount sufficient to esterify all the available

groups. Such an amount, in the case of a monocarboxylic acid material is, of course, at least an equimolar amount and in the case of a dicarboxylic acid material, that is, where $R^3$ is, or contains, a carboxy group may be up to twice the molecular amount of acid material, etc.

Direct esterification with the ether alcohol may be catalyzed or non-catalyzed and may be conducted in the absence or presence of an inert solvent such as toluene or xylene, which removes the water formed during the esterification reaction as an azeotrope. Conventional esterification catalysts such as sodium bisulfate, sulfonic acids, sulfuric acid, phosphoric acid, cationic resin catalysts, etc., may be employed but, since these materials have a tendency to decompose some of the tertiary-alkoxyalkanol, non-catalyzed procedures are preferred when direct esterification is to take place. Preferred temperatures for direct esterification are about 100 to 150° C.

Transesterification or ester interchange is employed to convert other esters of the carboxylic acid to the tertiaryalkoxyalkanol esters and in such circumstances the stoichiometric amount of the tertiary alkoxyalkanol needed to esterify every carboxyl group of the acid material is preferably reacted, in order to obtain a pure product. The ester interchange reaction may be carried out in the presence of the acid catalysts mentioned above, but preferably the reaction uses a basic or at least less acidic catalyst than employed in direct esterification. Effective catalysts are tetraisopropyl titanite, tin oxalate, dibutyl tin oxide, lead oxide, zinc stearate or manganous acetate. The alkali metals may be used and may be in the form of their alcoholates, prepared separately or in situ by adding small amounts of the alkali metals to the t-alkoxyalkanol. Alkali metal hydrides such as calcium, sodium, magnesium and lithium hydrides are also suitable catalysts. The ester interchange reaction is normally carried out at about the reflux temperature of the reaction mixture, at atmospheric pressure, but may be conducted at reduced pressure if desired. Preferred temperatures are in the range of about 100–200° C., although the temperature may reach about 275° C. or more.

As mentioned, acid catalysts, especially strong-acid catalysts, are preferably avoided in order to obviate internal reactions of the ether-alcohol, leading to premature olefin liberation. Catalyst concentrations for catalyzing both esterification and ester interchange reactions are usually in the range of about 0.01 to 2%. After the reaction is complete, the tertiaryalkoxyalkyl esters may be separated from the reaction mixture by using the solvents mentioned above. Other common methods of purification, such as sublimation, crystallization, distillation, extraction, etc., may also be employed if desired.

Typical carboxylic acids which may be used to provide the

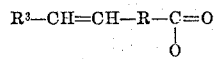

group in accordance with this invention are acrylic and substituted acrylic acids such as crotonic and other butenic acids, maleic acid, itaconic acid, fumaric, citraconic, oleic, ricinoleic, linoleic, linolenic, dimethyl vinyl acetic acids, etc. As mentioned, the inner or outer anhydrides of these acids are useable, as well as the acyl chlorides, or the mono- or polyesters of these acids. When a fully esterified acid derivative is to be converted to the tertiaryalkoxyalkyl ester by ester interchange, the ester group is preferably lower alkyl, to provide for removal of the alcohol of decomposition by vaporization during the ester interchange.

Mono and dicarboxylic mono-unsaturated acids of 3 to 12 carbon atoms and their diesters with lower alkanols, are the preferred acid starting materials to produce the preferred polymers for foaming. Where the $R^3$ group is an ester group different from the

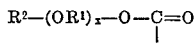

radical, the $R^3$ substituent, can be added to the acid functionality by esterification before the resulting material is esterified with the tertiaryalkoxyalkanol. Even before this "unbalancing" esterification, however, it is advisable first to esterify the acid group which is later to be reacted with the tertiaryalkoxyalkanol with a simple low molecular weight alcohol such as methanol, which later is removed in transesterification.

The tertiaryalkoxyalkanol, $R^2$—$(OR^1)_x$—OH is generally prepared by etherification of the glycol $H(OR^1)_xOH$ with a tertiary olefin, that is, an olefin having a double bond at its tertiary carbon atom, as described in my copending application Ser. No. 177,747, filed Mar. 6, 1962. This etherification reaction may be conducted using a cationic exchange material in the hydrogen form and in an amount sufficient to catalyze the selective conversion to the tertiary alkyl monoether. Among the ion exchange materials useful for this reaction are relatively high molecular weight water-insoluble resins or carbonaceous materials containing an $SO_3H$ functional group or a plurality of such groups. These catalysts are exemplified by the sulfonated coals (Zeo-Karb H, Nalcite X, and Nalcite AX) produced by the treatment of bituminous coals with sulfuric acid, and commercially marketed as zeolitic water softeners or base exchangers. These materials are usually available in a neutralized form, and in this case must be activated to the hydrogen form by treatment with a mineral acid, such as hydrochloric acid, and water washed to remove sodium and chloride ions prior to use. Sulfonated resin type catalysts include the reaction products of phenol-formaldehyde resins with sulfuric acid (Amberlite IR-1, Amberlite IR-100, and Nalcite MX). Also useful are the sulfonated resinous polymers of coumarone-indene with cyclopentadiene, sulfonated polymers of coumarone-indene with furfural, sulfonated polymers of coumarone-indene with cyclopentadiene and furfural and sulfonated polymers of cyclopentadiene with furfural. The preferred cationic exchange resin is a strongly acidic exchange resin consisting essentially of a sulfonated polystyrene resin, for instance a divinylbenzene cross-linked polystyrene matrix having about 0.5 to 20 percent, preferably about 4 to 16 percent, divinylbenzene therein to which are attached ionizable or functional nuclear sulfonic acid groups. This resin is manufactured and sold commercially under various tradenames, e.g. Dowex 50, Nalcite HCR, Permutit Q. This resin, as commercially obtained, has a moisture content of about 50% and it can be used in the etherification process in this form or it can be dried and then used with little or no differences in results ascertainable. The resin can be dried as by heating at a temperature of about 212° F. for 12 to 24 hours or the free water can be removed as by refluxing with benzene or similar solvents and then filtering. The catalyst concentration range should be sufficient to provide the desired catalytic effect, e.g. between about 0.5 and 50 percent (dry basis) by weight of the reactants, with the preferred range being between about 5 to 25 percent (dry basis), for example, 10 percent. A weight hourly space velocity of about 1 to 8 (based on hydrocarbon feed) and up to about 17 based on total hydrocarbon and glycol may be used with advantage. The WHSV can be about 0.1 to 100 based on hydrocarbon feed only, with the preferred WHSV being about 2 to 20.

The ether-alcohol can be formed by reacting the tertiary olefin with about 0.1 to 100 moles of the glycol per mole of tertiary olefin, the usual amount being between about 0.5 to 5 moles of glycol per mole of tertiary olefin.

The reaction, for example in the case of isobutylene and ethylene glycol, can proceed as follows:

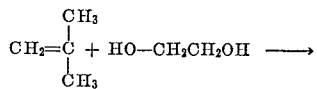

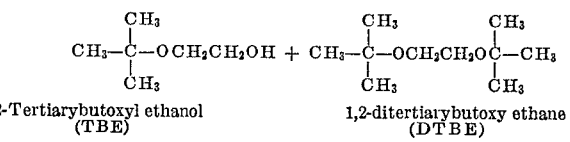

2-Tertiarybutoxyl ethanol (TBE)   1,2-ditertiarybutoxy ethane (DTBE)

The tertiary alkanol ethers of the following glycols and polyols may be used for example: ethylene glycol, diethylene glycol, polyethylene glycols, propylene glycol, polypropylene glycol, mixed ethers of ethylene and propylene glycols, butylene glycols, 1,5-pentanediol, 2-ethylhexane-1,3-diol, 1,10-decane diol, trimethylol propane, glycerine, neopentyl glycol, and pentaerythritol. In the case of diols, the monotertiaryalkyl ether is employed for esterification. However, in the case of triols, tetraols and higher polyols, it is possible to use mono-, di-, or tritertiarylalkyl ethers, so long as at least one free OH group is available for esterification. It is also possible to use tertiaryalkyl ether derivatives of polyols which contain inorganic atoms, such as boron, silicon, aluminum, tin, lead, etc. Ethers representative of those which may be employed are:

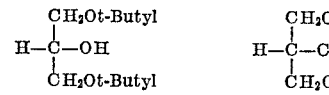 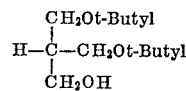
I  II

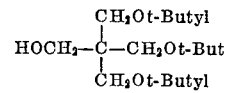 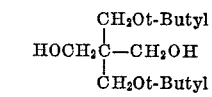
III  IV

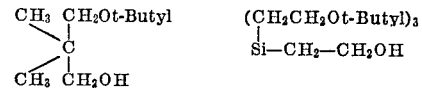 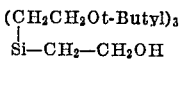
V  VI

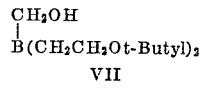 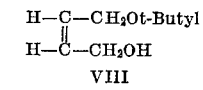
VII  VIII

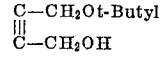 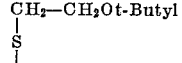
IX  X

The esters may also sometimes be prepared by esterifying one hydroxyl of the glycol with the acid before etherification of the other hydroxyl with tertiary olefin, but this procedure, applied to polycarboxylic acid, may lead to reaction products containing mixed short-chain polyetsers which are desirably avoided.

Polymerization of unsaturated esters of tertiaryalkoxyalkyl esters of carboxylic acids has been carried out employing a variety of polymerization techniques. In many cases these monomers were homopolymerized, and in other cases copolymers were prepared. Typical examples of tertiaryalkoxyalkyl esters which have been employed as monomers to yield feedstock resins employable in the instant invention are as follows:

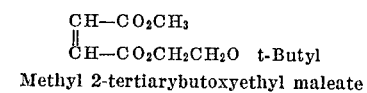

Methyl 2-tertiarybutoxyethyl maleate

CH₃—CH=CH—C(=O)—OCH₂CH₂O—t-Butyl
Tertiarybutoxyethyl crotonate

CH₂=C—CO₂CH₂CH₂O—t-butyl
  |
  CH₂
  |
  CO₂CH₂CH₂O—t-butyl

Bis(2-tertiarybutoxyethyl) itaconate

CH₃  O
        |   ||
CH₂=C——C—OCH₂CH₂O—t-Butyl
Tertiarybutoxyethyl methacrylate CH₃—C—CO₂CH₂CH₂O—t-Butyl          CH₂=C—CO₂CH₃
    |                                 |
    CH₂                    or         CH₂
    |                                 |
    CO₂CH₃                           CO₂CH₂CH₂O t-Butyl Methyl 2-tertiarybutoxyethyl itaconate O
         ||
CH₂=CH—C—OCH₂CH₂O—t-Butyl
Tertiarybutoxyethyl acrylate CH—CO₂CH₂CH₂O t-Butyl
              ||
tBuOCH₂CH₂O₂C—CH Bis(2-tertiarybutoxyethyl) fumarate CH₃
               |
CH₃—CH=CH—CO₂CH—CH₂—O—t-Butyl
Tertiarybutoxypropyl crotonate CH—CO₂CH₂CH₂O—t-Butyl
       ||
CH₃CO₂—CH Methyl 2-tertiarybutoxyethyl fumarate CH₃       CH₃
      |         |
CH₂=CH—CO₂CH—CH₂—O—t-Butyl
Tertiarybutoxypropyl methacrylate CH—CO₂CH₂CH₂O—t-Butyl
||
CH—CO₂CH₂CH₂O—t-Butyl Bis(2-tertiarybutoxyethyl) maleate CH₃
             |
CH₂=CH—CO₂CH—CH₂—O—t-Butyl
Tertiarybutoxypropyl acrylate The useable U monomers are organic materials of two or more carbon atoms having olefinic, generally alpha-olefinic, unsaturation. Vinylene,

HC=CH
 |  | and vinylidene

H₂C=C—
    | materials may be used, but usually the very wide availability of substituted vinyl monomers makes these materials preferred for copolymerization. Thus, although the U monomer may be vinylidene chloride, chloroprene, etc., the U monomer generally may be considered an ethylene derivative, that is, of the formula H₂C=CHX. Thus, vinyl chloride fits this formula, X being a halogen. Where X is cyano, acrylonitrile is used; where X is acetyl, the monomer is vinyl acetate; where X is methylate, methylmethacrylate is the monomer; where X is hydrogen the monomer is ethylene, etc. In a number of instances X is hydrocarbon of 1 to 10 carbon atoms, for example, lower alkyl such as propyl (1-pentene), vinyl (butadiene) and phenyl (styrene). Useable vinyl monomers include also vinyl benzoate, p-chlorostyrene, 3,5-dichlorostyrene, p-methoxystyrene, vinyl pyridine, vinyl carbazole, etc., octyl acrylate, alpha-chloroacrylonitrile, dimethyl acrylamide, etc. Partial homopolymers and copolymers of these olefinic compounds may also be used as the U component. Frequently the U monomers contain about 2 or 3 to 20 or more carbon atoms, preferably up to about 12 carbon atoms.

As can be readily understood, the number of possible copolymer systems employing T and U components is large, and is limited merely to the selection of appropriate monomer systems showing favorable reactivity ratios for copolymerization. This reactivity may be expressed by the reactivity ratio product ($r_1 r_2$) and, in order for copolymers to form, the reactivity ratio product should preferably be equal to or less than unity, that is, the reciprocal of $r_1$ would be equal to or less than $r_2$. Reactivity ratios are determined on an empirical basis for each copolymer system, as follows:

$$r_1 = \frac{k_{11}}{k_{12}} r_2 = \frac{k_{22}}{k_{21}}$$

where $k_{11}$ is the rate constant for an $m_1$ radical to react with or add to an $m_1$ monomer; $k_{12}$ is the rate constant for an $m_1$ radical to add to or react with monomer $m_2$. Likewise, $k_{22}$ expresses the rate of reaction between radical $m_2$ and monomer $m_2$ while $k_{21}$ is the rate constant for addition of an $m_2$ radical with an $m_1$ monomer.

As for proportions, these are assigned in view of the properties desired in the final polymer as well as the amount of foaming desired. The polymer may frequently have about 0.01 to 10 preferably about 0.1 to 1 part by weight of the T monomer residue for each part by weight of the U monomer residue. More often, there is about one part by weight of vinyl-type monomer residue for each 0.1 to 1 part by weight of the tertiary-butoxyethyl ester of an olefinically unsaturated alkanoic monoacid, diacid, or diacid methyl monoester of 3 to 6 carbon atoms. The T and T¹ groups often comprise at least about 1% by weight of the polymer, usually about 5, 15 or 25 to 75% by weight of the feedstock polymer. Unrelated (U) groups therefore may comprise up to about 99% of copolymers, for instance about 25 to 75, 85 or 95%. Thus, as will be apparent to those skilled in the art, the polymerization feed may comprise 1–100% by weight of the T monomer, the essential balance comprising other vinyl-type compounds, that is, olefinic copolymerizable hydrocarbons, etc., needed to give the desired foam product.

These monomers may be homopolymerized or copolymerized in solution, in emulsion, in bulk, or in suspension by using a catalyst or other source of free radical polymerization initiator, for example, gamma rays from cobalt 60. Among the catalysts which may be employed are benzoyl peroxide, ammonium potassium persulfate, tertiarybutyl perbenzoate, tertiarybutyl hydroperoxide, methylethyl ketone peroxide, azobisisobutyronitrile, etc. These catalysts are generally used in an amount of about .005 to 1% by weight of the monomer.

In solution polymerization, generally a 5 to 75% solution of the monomer is employed. Preferably the solvent is one with a low chain transfer constant, such as benzene, alkylbenzenes and cyclohexane. Emulsion polymerization satisfactorily employs water and a surface active or emulsifying agent such as sodium lauryl sulfate, sodium stearate, polyalkalene oxides, quaternary ammonium salts, etc. The emulsifying agent can be employed in the amount of about 0.5 to 5% by weight of the monomer, which itself comprises about 10 to 50% by weight of the emulsion. Suspension polymerization differs from emulsion polymerization in that a strong electrolyte is included in the reaction mixture to coagulate the polymer as it forms. This method is preferred, as the coagulated polymer appears in the form of beads of improved manipulative characteristics.

Polymerization of the tertiary alkoxyalkyl ester monomer generally takes place at a temperature of about 5° to 150° C., preferably 20° C. to 100° C. at a pressure from atmospheric to about 100 atmospheres or more, although when some materials, such as ethylene, are used for copolymerization, the pressure may vary from about 1000 to 10,000 p.s.i. and the temperature may be about 250 to 300° C. Generally this reaction will require maintaining these conditions for about 1 to 24 hours, or even longer when polymerization is catalyzed by gamma rays. Such conditions are used whether a tertiary alkoxyalkyl ester homopolymer or copolymer is formed. When a random or alternating copolymer is to be formed the monomers are mixed before or during polymerization; to form block copolymers, a prepolymer with reactive ends is formed from one of the monomers and then the other monomer is added. Also, some monomeric materials "automatically" produce block copolymers from a mere mixture of monomers. When a graft copolymer is to be formed, a prepolymer is made having reactive sites along its length and then the other monomer is added.

When a condensation polymer is used as the feedstock to the foaming reaction, it will often be a polyester of the type $$HO—(—K—L—)_m—(—K—L'—)_n—H$$

in which (—K—L—) represents the recurring group

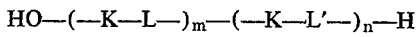

and (—K—L'—) represents the recurring group

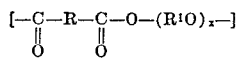

The R, $R^1$, and $R^2$ groups are as defined above. It is noteworthy that R itself may be the result of polymerization, for example, of acrylic acid derivatives such as esters. $R^4$ is a hydrocarbon (including oxy or ether hydrocarbon), say alkyl, having a valence of three or more and otherwise similar to the $R^1$ radical described above. —$(R^4—O)_y$— is usually the residue of a triol or more highly hydroxylated compound, the value of $y$ being in the same range as the values given above for $x$. The symbols $m$ and $n$ are numbers and their total is sufficient to produce a polyester resin of desired properties. This total will usually range up to about 1000. Although $m$ may be zero, the value of $n$ is at least 1 and usually is high enough to give the amount of blowing agent, in the form of $R^2$ groups, desired. Preferably, analogously to the addition polymers, $n$ will be 5 or 25 to 75% of the total of $m$ and $n$.

The polymer ester can be made by conventional polyesterification techniques using a neutral or basic catalyst and a feedstock mixture sufficient to supply $m$ moles of the L component, $n$ moles of the L' component and $m+n$ moles of the acid component. A preferred manufacturing method employs trans-esterification using a diester of the acid, K, component with a readily volatile alcohol such as a lower alkanol. In this method $m$ moles of the L component glycol and $n$ moles of the L' tertiaryalkoxypolyol component are included in the reaction mixture. Polyesterification takes place at temperatures usually in the range of about 90 to 300° C. or more, preferably between about 110 and 270° C. temperatures lower than about 110° C. may sometimes be employed.

It also sometimes may be desired to use a method derived from my copending application Ser. No. 177,749, filed Mar. 6, 1962. Following such a technique, an ester interchange reaction is conducted using a tertiaryalkoxyalkyl diester of the formula

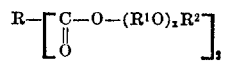

and a tertiaryalkoxyalkyl diester of the formula

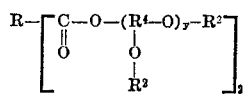

using a neutral or basic catalyst. During the reaction tertiary alkoxy alkanol is produced and removed from the system, preferably by use of a reduced pressure. Thus $HO(R^1O)_xR^2$, which usually is the more volatile of the alcohols, is produced and removed. Any

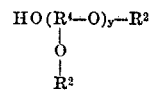

alcohol which is produced in the polyesterification may advantageously be left in the reaction product as these tertiaryalkoxyalkanols provide additional blowing agent. The reaction may take, for instance, 1 to 10 or more hours for completion. Typical ester interchange catalysts which can be employed are, as mentioned above, tetraisopropyl titanate, manganous acetate, dibutyl tin oxide, zinc stearate, litharge, etc., or other catalysts which catalyze ester interchange reactions.

The starting diesters may be made, by methods known to the art, from suitable acid and alcohol reactants. As mentioned, the alcohol is usually a lower alkanol, preferably methanol, which will vaporize at the temperature and pressure of transesterification, while the acid is the K component which is to appear in the final product. Typical acids which may be used to prepare the diesters are oxalic acid, undecylenic acid, malonic acid, succinic acid, glutaric acid, adipic acid, pimelic acid, suberic acid, azelaic acid, sebacic acid, tricarballylic acid, orthophthalic acid, terephthalic acid, isophthalic acid, dimers of unsaturated fatty acids, mesitoic acid, trimellitic acid, trimesic acid, and pyromellitic acid. Anhydrides or mono- or polyesters of these acids may be used as well as the acids themselves. Acid chlorides may also be employed.

The L' component may be thought of as the reaction product of the etherification of a tertiary olefin, such as isobutylene, an isoamylene or an isohexene, with a polyol having at least three hydroxyl groups. Monotertiary alkoxy ethers of polyols such as trimethylol propane, glycerine, pentaerythritol, etc., may be employed, preferably leaving at least two free hydroxyls for polyester polymer formation and providing one or more tertiaryalkoxyalkyl groups in the polymer for decomposition during olefin liberation. It is possible to use tertiaryalkyl ether derivatives of polyols which contain inorganic atoms, such as boron, silicon, aluminum, tin, lead, etc. The following are typical tertiarylalkoxypolyols which may be used to give a feedstock resin useable in this invention:

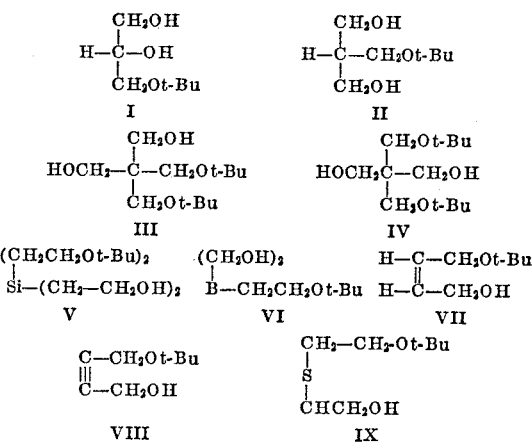

These tertiary alkoxypolyols may be prepared by the method described in my copending application Ser. No. 177,747, filed Mar. 6, 1962. Preferably, the simplest materials are used in this foam resin improvement; namely, isobutylene, as the parent of the tertiaryalkoxy radical and 1,3-di-tertiary butoxy-2-propanol (the reaction product of isobutylene and glycerol, as the tertiaryalkoxy-glycerol radical. The L component is chosen from among those materials, the residue of which is to appear in the final product. Such polyols as the following may be used in accordance with the present invention: ethylene glycol, diethylene glycol, polyethylene glycols, propylene glycols, butylene glycols, 1,5-pentanediol, 2-ethylhexane-1,3-diol, 1,10-decane diol, trimethylol propane, glycerine, neopentyl glycol, pentaerythritol, etc.

The process of this invention comprises subjecting the polymer feedstock described above to conditions which serve to liberate the olefin, foam the polymer resin and cause cross-linking of the free hydroxyls. Two or all three of these reactions may occur simultaneously, or they may be sequential in the order described.

Liberation of the olefin from the tertiary alkoxyalkyl ether linkage may be performed simultaneously with or prior to the foaming and may be brought about by thermal decomposition alone, or by the action of a catalyst, usually at a temperature at least somewhat elevated above ambient temperature.

Olefin liberation may be brought about by heating the material, usually in the presence of one of the acid catalysts described below. The decomposition reaction is usually carried out at a temperature of at least about 50° C. and may range up to the decomposition temperature of the polymer, say about 350° C. Preferably, the decomposition takes place at a temperature of about 70°–150° or 300° C. This heating may take place under pressure, and/or at a temperature below the softening temperature of the polymer beads or other form, to decompose the ether linkage without foaming. In such circumstances the liberated tertiary olefin appears to be dissolved, or at least thoroughly and finely dispersed in the polymer which may be then cooled, transported, etc., as an unfoamed material.

Preferably the liberation of the tertiary olefin is brought about at, or below, the curing temperature of the bulk polymer or the solvent vaporization temperature of a gelled plastisol. When using a strong acid catalyst such as sodium bisulfate or sulfonic acids, liberation of tertiary olefin can take place at about 75–150° C. With weaker catalysts such as carboxylic acids, or no catalyst, a higher temperature is generally required, so that the catalyst may be chosen for a liberation temperature to coincide with the curing temperature of the foam. Preferably the pressure is about atmospheric or greater, depending upon whether or not simultaneous foaming is desired.

Foaming itself may be brought about by heating this polymer material to its softening temperature under, say, atmospheric pressure, or even by melting the polymer under elevated pressure sufficient to prevent escape of the gas from the foam. More often, foaming conditions are established during olefin liberation so that gas production, foaming and frequently even some cross-linking, take place simultaneously. Insofar as the physical state of the foamable composition is concerned, the polymer is often foamed from a melt or may be in the form of a plastisol or organosol of foamable or blowing viscosity. The preferred viscosity for foaming varies, depending upon the polymers used, but generally is in the range of about 50 centipoises to 20,000 poises. The resin feedstock is heated to a temperature at or above its softening temperature. The upper temperature limit for foaming will be the decomposition temperature of the polymer feedstock or the temperature where a viscosity of about 50 centipoises is reached, whichever temperature is lower. The foaming of the polymer may be accomplished by placing the polymer in a mold conforming to the desired shape of the finally expanded molded article. Foaming can be effected by heating the mold with steam, hot water, or by other methods known to the art. In many cases, other conventional foaming procedures may be employed. For example, cross-linkable polymers described herein may be expanded using extruding equipment. The premixed essentially solid polymer containing cross-linking agents, plus catalyst can be added to the hopper of an extruder and extruded at 90–200° C., depending on the polymer composition, catalyst and cross-linking agent.

Cross-linking generally takes place by the interaction of the hydroxyalkyl group, generated via liberation of isoolefin, with polyfunctional organic or inorganic compounds, or suitable mixtures thereof, and often the resulting cross-link contains an ester, ether or urethane moiety. Thus the cross-linking agent may be any of a number of polyfunctional materials, organic or inorganic, which react, under the cross-linking conditions, to leave the divalent —Q— radical in a form suitable for bridging between the hydroxyl residues of feedstock polymer chains made available by decomposition of the tertiaryalkoxyalkyl radicals. Desirably, the cross-linking will be performed by an esterification reaction, so that —Q— will desirably be a divalent organic or inorganic acid radical, such as is provided by the organic di- or other polycarboxylic alkanoic or aromatic acid for instance, often of about 2 to 20 carbon atoms or their acid chlorides and anhydrides; e.g., maleic anhydride, phthalic anhydride, isophthalic acid, terephthalic acid, adipoyl chloride, adipic acid, pyromellitic anhydride, succinic anhydride, succinic acid, fumaric acid, trimellitic anhydride, citric acid, etc. Included in this category, also are the styrene-maleic anhydride copolymers, generally containing a 1:1 ratio of styrene to maleic anhydride.

Other materials which react to cross-link by reaction with pendant —OH groups are arylene and alkylene diisocyanates preferably of about 6 to 20 carbon atoms. Examples of isocyanates which may be employed are p,p'-diphenylmethane diisocyanate, 2,4-tolylene diisocyanate, 2,6-tolylene diisocyanate, naphthylene diisocyanates, phenylene diisocyanates and the like. Formaldehyde, phenol formaldehyde resins, melamine formaldehyde resins, urea formaldehyde resins and other such resins can react with pendant —OH groups of the particular polymer being cross-linked. Other suitable organic cross-linking agents are commercially available epoxy resins such as Shell's Epon resins (derived from bisphenol A), Koppers' Kopoxite resins (derived from resorcinol), and FMC's Oxiron resins (derived from butadiene).

Cross-linking may also take place by the use of suitable inorganic, organometallic, or organometalloid derivatives. For example, titanium tetrachloride, titanium oxide or titanium esters such as octylene glycol titanate, tetraisopropyl titanate and related orthotitanate esters are particularly suitable for this purpose. When titanium cross-linking agents are employed, one frequently obtains additional beneficial catalytic effects, such as enhancement of isoolefin liberation from the tertiaryalkoxyalkyl-containing unit of the homopolymer or copolymer. Furthermore, titanium derivatives are efficient ester-interchange catalysts and are capable of promoting the cross-linking reaction via ester interchange. Other suitable cross-linking catalysts include stannous chloride, which yields as the —Q— group —Sn—, stannous oxalate, dibutyl tin oxide, zinc chloride, zinc alcoholates, silicon tetrachloride, dichlorosilanes, such as ortho-diphenyldichlorosilane, orthosilicate esters of the type $Si(OR)_4$, aluminum chloride, aluminum alkoxides of the type $Al(OR)_2Cl$, $Al(OR)Cl_2$, $Al(OR)_3$, $BCl_3$, $BF_3$, boron esters of the type $B(OR)_3$, etc. Aluminum, silicon and boron alkyls such as triethyl aluminum, triisobutyl aluminum, tridecyl aluminum, ethylaluminum dichloride, diethyl aluminum chloride, trialkyl boron compounds and alkyl boron halides, e.g., $Et$-$B$-$Cl_2$, $Et_2BCl$, etc., are suitable cross-linking agents. Most of the reactive derivatives of the transition metals and phosphorus, such as their halide derivatives or their organic ester and metal alkyl, or combination halide-ester, halide-alkyl derivatives are beneficial cross-linking agents and catalysts, so long as they are capable of exhibiting a functionality of at least two in reaction with a hydroxyl group, or are capable of otherwise inducing cross-linking via ester interchange reactions. Phosphorus compounds also frequently serve to give fire-retardant properties to the foam. Appropriate mixtures of the inorganic and organic cross-linking agents are frequently used, for example, to obtain the desired degree of cross-linking and at the same time to obtain the optimum catalytic effect for isoolefin liberation.

When a catalyst, distinct from the cross-linking agent, is employed to cause liberation of the tertiary olefin gas this catalyst, for decomposition of the tertiaryalkoxy side chain, may be an acidic material, that is, any material which, according to the Lewis theory, contributes a proton to the reaction mixture. Such acid-acting, solid, dispersible-solid, or liquid materials as sodium bisulfate, phosphotungstic acid, sulfuric acid, quaternary ammonium salts, carbonylic or even carboxylic acids, sulfonic acids, phosphoric acids, cationic exchange resins in the hydrogen form, etc., may be employed. Tertiary amines, e.g., an N-alkyl morpholine such as N-methyl, N-ethyl, or N-lauryl morpholine or a quaternary ammonium salt thereof, such as that of acetic anhydride and N-methyl morpholine, will catalize the urethane reaction. Other tertiary amines such as dimethyl ethanolamine, trimethylamine or triethylamine may also be used for this purpose.

A transesterfication catalyst may be employed without a cross-linking agent to bring about cross-linking according to the mechanism:

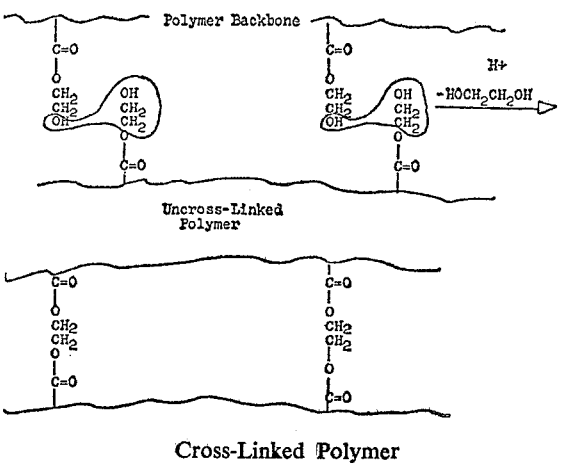

Cross-Linked Polymer

Some cross-linking of these systems may also occur by splitting out of water between two hydroxyalkyl side chains as shown below. This method of cross-linking, however, occurs to a much smaller degree than cross-linking by trans-esterification:

Cross-Linking by Ether Formation

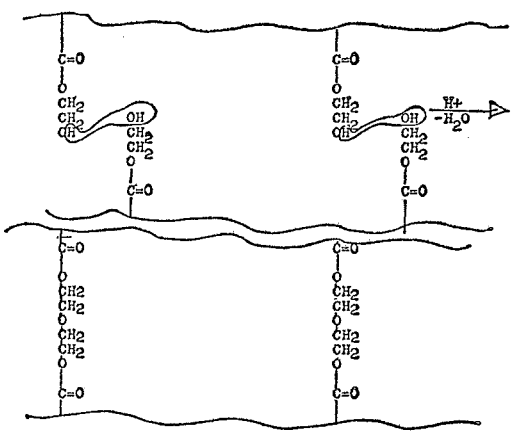

A catalyst which is dissolved or suspended in the polymer resin or resin mixture is preferred and generally the catalyst can be present in the olefin liberation reaction mixture in a minor amount of say about 0.01 to 2%.

In some situations, especially those involving vinyl-type polymer backbones having free acid functionalities, it may often be preferable to employ the tertiaryalkoxyalkyl radical in the cross-linking agent; thus an agent of the type $R^2$—$(OR')_x$—O—Q—O—$(R'O)_x$—$R^2$ may often be used, as well as the ditertiaryalkoxy substituent glycols of the formula $R^2$—$(OR')_x$—O—$R^2$ where $x$ has the same value as before, that is, 1 to 25, preferably 1 to 5. The —Q— group may be any of the difunctional cross-linking moieties above described. The vinyl-type polymers susceptible to cross-linking by such agents may be described by the general formula:

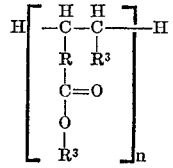

where the R and $R^3$ radicals and $n$ are as described above, and often are copolymers of vinyl-type unsaturated acids and other substituted ethylenes as described above. For example, a styrene-maleic anhydride copolymer may be cross-linked and foamed by the use of ditertiary-alkoxy substituted glycol, the reaction releasing tertiary olefin and providing free hydroxyl groups attached to an alkyl, which can then react by esterification to cross-link the maleic acid groups of different molecules. Also, in this same situation, a tertiaryalkoxyalkanol diester of a dicarboxylic acid, e.g. bis (2-tertiarybutoxyethyl) phthalate may serve as the foaming and cross-linking agent, producing foam by release of the tertiary olefin and producing cross-linking by an esterification reaction between the resulting bis(hydroxyethyl) phthalate and the anhydride moieties of adjacent polymer backbones. These diesters also may sometimes be employed when the backbone polymer presents free hydroxyl groups, for example, in a styrene-vinyl alcohol copolymer, in which case, the foaming and cross-linking reaction may produce glycol as well as the tertiary olefin.

Useable tertiaryalkoxyalkyl-containing cross-linking agents may often have a formula akin to the tertiaryalkyl-oxyalkyl diesters

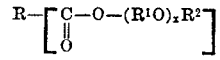

described above and in copending application Ser. No. 177,749.

The expandable copolymers or homopolymers of the present invention may be blended with the cross-linking agent prior to expansion of the polymer or after the polymer has been expanded. For example, a copolymer of styrene and tertiary-butoxyethyl acrylate may be expanded by liberation of isobutylene, without concurrent cross-linking, and the expanded polymer later cross-linked by adding cross-linking agent. When possible, however, the cross-linking agent is incorporated prior to olefin liberation, or at least prior to foaming and when a catalyst is employed for olefin liberation it is usually desirable to incorporate both materials into the resin feedstock to the process of this invention.

Frequently, as mentioned, the cross-linking agent will perform dual function—that is, it will catalyze isoolefin liberation as well as cross-linking.

The agents for catalyzing decomposition and/or cross-linking may be mixed with the polymerization reaction mixture before or during the polymerization reaction if these agents will not interfere with the polymerization and are not sensitive to other materials present in the reaction mixture. Preferably, however, catalytic and/or cross-linking agents and/or additional blowing agents are introduced into the feedstock polymer after separation of the polymer from the reaction mixture, but before olefin liberation. The agents may be introduced into the unexpanded polymer by physically mixing below the decomposition temperature of the tertiaryalkoxyalkyl group of the feedstock polymer or copolymer. Extraneous catalysts and cross-linking agents may be dissolved in a hydrocarbon solvent and the polymer soaked therein to absorb solvent, catalysts and cross-linking agent. If the catalysts and cross-linking agents are insoluble in hydrocarbon solvents and are easily hydrolyzed by an aqueous solvent, they may be dissolved in oxygenated solvents. Suitable solvents for this purpose are aromatic hydrocarbons, ketones, ethers, esters, amides, sulfoxides, nitriles, etc. Examples of solvents suitable for this purpose are acetone, methyl ethyl ketone, cyclohexanone, acetophenone, methyl isobutyl ketone, ethyl ether, ethylene glycol dimethyl ether, tetrahydrofuran, N,N-dimethyl formamide, N,N-diethyl formamide, dimethyl sulfoxide, acetonitrile and the like. Physical mixing of the unexpanded polymer with the catalyst and cross-linking agent may also take place in the absence of solvent. This may be especially desirable when the catalyst and cross-linking agents are compatible liquids. When in solid form, the catalyst and cross-linking agent may be admixed with the unexpanded polymer in a finely powdered form.

In the foaming of polymer systems where the amount of tertiary-alkoxyalkyl containing moiety is small, it may be beneficial to employ an accessory expanding agent to obtain the desired degree of foaming. In such cases the low boiling hydrocarbons such as isobutane, n-butane, isopentane, n-pentane, neohexane, hexane, heptanes and the like may be mixed into the feedstock resin. Such conventionally employed materials as $NaHCO_3$ which releases $CO_2$ under blowing conditions, $NaHSO_3$ which decomposes to $SO_2$, etc., may be incorporated in the polymer beads or other form of polymer in generally the same manner as the catalysts and cross-linking agents. When a liquid feedstock, for example, a plastisol, is employed, a simple mixing with an auxiliary hydrocarbon is sufficient. Where a solid polymer, for example, in bead form, is employed, the polymer may be placed in the liquid hydrocarbon and allowed to swell, absorbing the auxiliary material. Other auxiliary blowing agents may be employed, and, in the case of solid agents, such as sodium bisulfate, these agents may be coated on the solid polymer or dispersed in the liquid polymer by any convenient method. The distinct advantage of the present method for foaming, even when accessory expanding agents are employed, is that a large degree of built-in expanding agent and cross-linking sites are contained within the domain of the parent or feedstock copolymer or homopolymer system. Thus, little or no accessory expanding agents are generally required. However, in conventional foaming procedure for vinyl polymers such as polystyrene beads, hydrocarbon expanding agents or other expanding agents are always required.

As mentioned, the foaming may take place subsequent to the olefin liberation or simultaneous with it. Also, usually, the cross-linking occurs during the foaming step. However, if cross-linking does not occur concurrently with the foaming step, it may be effected by curing by post-heat treatment, which may take place within the mold or in a curing oven. The post-heat curing treatment is normally carried out at temperatures of 75–200° C. for time intervals of a few minutes to several hours, depending upon the catalyst and cross-linking agents employed and upon the homopolymer or copolymer composition.

The following examples of this invention are to be considered illustrative only and not limiting.

Example I

The 2-tertiarybutoxyethanol is prepared as follows. Into a 1-liter autoclave are charged 134 g. of isobutylene and 400 grams of commercial grade ethylene glycol. Fifty grams of Dowex 50X–12 sulfonated polystyrene-divinylbenzene type solid resin catalyst containing 12% divinylbenzene is added to the autoclave. The catalyst has a mesh size of about 50–100 and contains from about 42–48 percent moisture. The autoclave is sealed and the reaction mixture heated at 93° C., under autogenous pressure, for a period of about seven hours. The product is removed after cooling and depressurizing the autoclave. The product is worked up by first distilling off the unreacted isobutylene. The distilland (residue) is further distilled at atmospheric pressure or in vacuo to obtain as overhead the tertiarybutoxyethanol.

Into a 100 ml. flask fitted with an 18″ distillation column were placed 20 grams of stabilized methyl methacrylate, 59 grams of tertiarybutoxyethanol and 0.05 grams of tetraisopropyl titanate catalyst. The mixture was heated at 130–145° C. for about 4 hours during which time 5 grams of methanol was collected overhead. The mixture was then distilled in vacuo to afford unreacted tertiarybutoxyethanol and tertiarybutoxyethyl methacrylate, B.P. 42–44° C./0.07–0.008 mm., $n_D^{20}$ 1.4306, $D^{20}/4$ 1.0491. Ten grams of the homopolymer of tertiary butoxyethyl methacrylate was prepared in refluxing benzene using azobisisobutyronitrile as a catalyst. The polymer was a flexible solid after evaporation of the benzene. The polymer could be molded into sheets or cast into films. Infrared examination of the polymer showed characteristic absorption for the tertiarybutoxy grouping and ester grouping. The above polymer was mixed with 2.5 grams of pyromellitic dianhydride and 0.05 gram of stannous oxalate. The mixture was heated in a mold at 120 to 200° C. for about ½ hour during which time concurrent liberation of isobutylene, foaming and cross-linking took place. A rigid, foamed polymer was obtained which conformed to the dimensions of the mold.

Example II

To a reaction vessel was charged 2500 parts of distilled water, 0.5 part of sodium lauryl sulfate, 7.5 parts of gelatin, 25 parts sodium sulfate and 7.5 parts stearic acid. The mixture was heated at 70–80° C. and the following monomer charge added over a period of about 1 hour: 200 grams 2-tertiarybutoxyethyl methacrylate, 550 grams inhibitor-free styrene and 5.0 grams benzoyl peroxide. The mixture was heated at 70–80° C. for a period of about 4 hours to give a quantitative yield of white copolymer beads. The beads were filtered and washed with dilute hydrochloric acid, followed by several water washes, and dried in a forced-air oven at 60° C. for several hours. A portion of the above beads was mixed with liquid titanium tetrachloride and heated in a mold at 90–150 C. for twenty minutes, whereupon expansion of the beads took place with concurrent cross-linking. The expanded and cross-linked beads were only slightly soluble in hydrocarbon solvents, e.g., benzene, toluene, xylenes, whereas the beads before expansion were readily soluble.

Another portion of the above beads was treated with a solution of methyl aluminum dichloride and pentane, which caused impregnation of the beads with some diethyl aluminum chloride and pentane. The beads were placed in the mold and heated at 90–165° C. for about ½ hour to give a foamed polymer showing improved thermal and solvent resistance.

Still another portion of the beads was swollen for a period of about one hour with a solution of about 5% pyromellitic anhydride in acetone and that solution was mixed with about an equal amount of benzene. After partial drying, the beads were placed in the mold and heated at 90–180° C. for about ½ hour during which time expansion occurred by liberation of isobutylene and vaporization of the added hydrocarbon. The pyromellitic anhydride, concurrently or immediately following isobutylene liberation, caused the beads to become cross-linked. The resultant copolymer foam was only slightly attacked by hydrocarbon solvents and had improved dimensional stability over conventional polystyrene foam or uncross-linked copolymer foams of the same composition.

In another experiment, a portion of the beads was saturated in about 30 minutes with a solution of 2,4-tolylene diisocyanate in pentane containing about 5% of tetrahydrofuran. The tetrahydrofuran-pentane solution contained a few percent of boron trifluoride catalyst. The swollen beads, containing about 5% of the pentane solution, were partially dried in a forced-draft oven at 50° C. and subsequently placed into a mold and heated at 100–160° C. for about one hour, during which time foaming and cross-linking of the polymer took place. The resultant polymer has good dimensional stability and improved resistance to hydrocarbon solvents when compared with conventional polystyrene foam.

Example III

To a reaction flask were charged 2500 parts of distilled water, 50 parts tricalcium phosphate and 0.15 gram of sodium dodecyl benzene sulfonate. The mixture was heated to 80° C., and the following monomer charge was added over a period of about ½ hour: 800 parts inhibitor-free styrene, 200 parts tertiary butoxyethyl acrylate and 7 grams benzoyl peroxide. The mixture was stirred for 7 hours at 70–80° C. during which time a quantitative conversion of monomers to copolymer beads occurred. The beads were washed with dilute hydrochloric acid and water and dried in a forced-draft oven at 60° C.

A portion of the above beads was mixed for about 30 minutes with a solution of about 2–3% phosphorus trichloride in a 30% benzene-70% pentane mixture so as to impregnate the beads with the $PCl_3$, which behaves as a catalyst and cross-linking agent. The impregnated beads were placed in a steam-jacketed mold and heated at 80–150° C. for about one hour, during which time expansion and cross-linking took place to afford a dimensionally stable, foamed polymer. The resulting foam showed improved dimensional stability, resistance to organic solvents and improved flammability properties when compared with conventional polystyrene foams. In this specific example, the cross-linking of the free hydroxyl groups of the copolymer took place by interaction with the impregnated phosphorus trichloride. Phosphorus oxychloride was also found to be suitable for use as a cross-linking agent and gave a cross-linked foam having similar properties to the example cited.

A portion of the above beads was impregnated for about 30 minutes with a 5% solution of a styrene-maleic anhydride copolymer prepared by dissolving a low molecular weight resin (about 750 M.W.) in a mixture of 95% pentane and 5% methylethyl ketone. The impregnated resin was dried in a forced-draft oven at 50° C. The impregnated beads were then placed in a mold and heated over a period of 1½ hours from 100° C. to 180° C., whereupon concurrent foaming and cross-linking occurred to give a foamed polymer showing better dimensional stability and solvent resistance than conventional uncross-linked polystyrene foam.

Example IV

Bis (2-tertiarybutoxy ethyl) maleate was prepared as follows. Into a 2-liter, 4-necked flask, equipped with a stirrer, therometer, Dean-Stark Trap and a condenser was placed 1 mole of maleic anhydride (98.06 grams) and 2.2 moles of 2-tertiarybutexyethanol, together with 500 ml. of toluene. The mixture was heated under reflux for several days and the water was removed continuously during the course of the reaction. After the theoretical amount of water was formed the solvent was removed and the bis (2-tertiarybutexyethyl) maleate was purified by distillation under reduced pressure. 2.7 grams of this ester are reacted with 90 grams of styrene by heating in solution with 0.01 to 0.5% benzoyl peroxide at 50–75° C. for 4–8 hours. After solvent removal, a hard, brittle copolymer is obtained. Solution polymerization reaction mixtures are treated with methanol or methanol-$H_2O$ mixtures to precipitate the polymer. The reaction produces 10 grams of polymer which is mixed with 0.05 gram sodium bisulfate and 2 grams toluene diisocyanate, 0.2 gram hexahydromethyl-aniline and the mixture is poured into a mold heated by a steam coil. Foaming starts at a temperature of about 140° C. and the foamed, cross-linked resin is held in the mold for 0.5 hour for curing. The foamed polymer has the formula

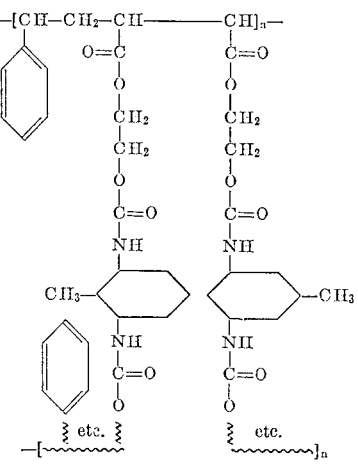

Example V

A solid copolymer was prepared by polymerizing 14 grams of bis(2-tertiarybutoxyethyl)maleate and 7.3 grams of styrene in refluxing benzene using azobisisobutyronitrile as a catalyst. The granular polymer formed was dried, and ten grams was mixed with 2 grams of p,p-diphenylmethane diisocyanate and 0.1 gram of stannous oxalate. The mixture was heated at 250–400° F. during which time isobutylene was liberated from the polymer and foaming of the polymer took place. The product was a foamed, crosslinked, semi-rigid solid.

Example VI

To a reaction flask was charged 2500 parts of distilled water, 0.5 part of sodium lauryl sulfate, 10 parts gelatin, 25 parts sodium sulfate and 7.5 parts stearic acid. To this mixture was added the following over a period of ½ hour: 500 parts styrene (inhibitor free), 160 parts bis(2-tertiarybutoxyethyl)maleate and 5.5 grams benzoyl peroxide. The mixture was stirred rapidly for a period of 18 hours at 65–70° C. to give a quantitative yield of white polymer beads which were washed with water and dried in a vacuum oven at 50° C.

A portion of the above beads was impregnated with 2–3% diphenyl dichloro silane in a 50% benzene-50% pentane solution. The impregnated beads were dried to remove the solvent and heated at 100–160° C. for about ½ hour during which time liberation of isobutylene and crosslinking of the polymer took place. In this particular instance, the crosslinks were composed of siloxane linkages. The crosslinked foam produced in this manner had superior thermal and solvent resistance properties to conventional polystyrene foam. Similar crosslinked products could be produced using mixtures of dichloro and trichlorosilanes and varying the size and number of the R-groups of the silanes, e.g., $RSiCl_3$ and $R_2SiCl_2$. $SiCl_4$ could likewise be employed for the same purpose.

A portion of the above beads was impregnated in a similar fashion with tetraisopropyl titanate and heated in the mold at 100° C. for about one hour during which time liberation of isobutylene and foaming of the polymer took place. In this particular case the foamed polymer was still somewhat soluble in organic solvents and the polymer was further crosslinked by post-curing at 150–200° C. for several hours.

In another experiment a portion of the beads immersed for about 30 minutes in a syrupy acid-catalyzed phenol formaldehyde polymer containing about 2% of the sulfuric acid used initially as the catalyst for condensation polymerization. The beads were placed in a mold and heated at 100–175° C. for a period of ½ hour, during which time liberation of isobutylene took place to give a foamed, crosslinked polymer.

In another experiment, a portion of the above beads was immersed for about 30 minutes in a commercial solution, sold as Epon 828, of 10% epoxy resin in mineral spirits and containing a small amount of BF$_3$-etherate catalyst. The impregnated beads were heated at 80 to 160° C. for about 1 hour in a mold which produced a semi-cured foamed polymer. This polymer was post-cured by heating at 150° C. for an additional two hours.

Example VII

In the following example, the foaming is caused by catalysis due to a carboxylic acid group which is part of the parent polymer chain.

A styrene-maleic anhydrided copolymer was prepared by polymerizing styrene and maleic anhydride in cumene solution at 200° C. using about 4 percent dicumyl peroxide as the catalyst. The resulting polymer had a molecular weight approximately equal to the following:

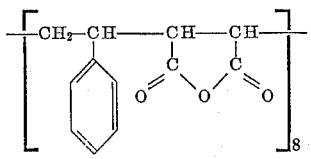

Into a 500 ml. resin kettle was placed 135.7 grams of the styrene-maleic anhydride copolymer and 230 grams of tertiarybutoxyethanol. The mixture was heated at 100–110° C. for 1½ hours to form a viscous mixture. The mixture was then heated in vacuo (1–2 mm.) to remove the unreacted tertiarybutoxyethanol. An extremely viscous syrup resulted which was shown by infrared analysis to contain a mixture of the half ester and possibly some of the diester. The resin was placed in a mold and heated at 140–150° C. whereupon liberation of isobutylene occurred with concurrent crosslinking to give an extremely hard, tough, foamed, crosslinked resin.

Example VIII

A copolymer was prepared by polymerizing 10.4 grams of styrene and 10.6 grams of bis (2-tertiarybutoxyethyl) itaconate in benzene using azobisobutyronitrile as the catalyst. Ten grams of the polymer was ground to a fine powder to which was added 1 gram of pyromellitic dianhydride. The mixture was pulverized and placed into a small mold which was heated slowly under nitrogen. At 120° C. the polymer mixture began to soften and isobutylene liberation was detectible. The temperature was gradually raised to 200° C. during which time extensive foaming and liberation of isobutylene occurred. The entire heating cycle was about 30 minutes. A hard, foamed, crosslinked polymer was obtained which conformed to the dimensions of the mold.

Example IX

Ten grams of the styrene-bis(2-tertiarybutoxyethyl) itaconate polymer of Example VIII was pulverized with 0.1 gram of stannous oxalate catalyst. The powder was placed in a mold and heated from 120 to 250° C. for a period of about ½ hour. During the heating period the polymer softened and isobutylene was liberated, which caused the formation of a foamed network. The polymer was less brittle than the polymer crosslinked with pyromellitic anhydride. This example shows crosslinking primarily by liberation of isobutylene followed by ester interchange within the polymer molecules themselves.

Example X

Into a 100 ml. flask equipped with a nitrogen inlet tube, thermometer, receiver, and condenser was placed 22 grams of dimethyl itaconate and 49.3 grams of tertiarybutoxyethanol. To this mixture was then added 0.1 gram of tetraisopropyl titanate catalyst. The mixture was heating at 140–155° C. for about 7 hours in a nitrogen atmosphere, after which time about 9 grams of methanol was distilled overhead. After removing the unreacted t-butoxyethanol by distillation, further distillation gave bis(2-tertiarybutoxyethyl) itaconate B.P. 130° C. at 0.1 mm., $n_D^{20}$ 1.4468, $D^{20}/4$ 1.0149.

Four grams of bis(2-tertiarybutoxyethyl) itaconate and 1.2 grams of redistilled styrene were placed in a 15 ml. polymerization tube together with 0.1 gram of benzoyl peroxide. The tube was sealed after purging with nitrogen and heated at 70° C. for 43 hours. A hard glassy polymeric material was formed, which was reprecipitated by dissolving in petroleum ether, followed by the addition of methanol. The polymer is ground and mixed in a mold with about 0.1% by weight of phosphotungstic acid. Subsequent heating of the mold to 140° C. caused softening and foaming of the polymer to give a rigid foam.

Example XI

Into a reaction vessel was charged 1500 parts of water, 5 parts of sodium dodecyl sulfate and 4 grams of sodium phosphate. The vessel was heated to 50° C. and the following monomer mixture charged over a period of 30 minutes: 400 parts vinyl acetate, 200 parts bis(2-tertiarybutoxyethyl) maleate and 3.5 grams alpha, alpha'-azobisisobutyronitrile. The mixture was polymerized overnight to give spherical beads, which were washed and dried in the usual fashion.

A portion of these beads was immersed for about 30 minutes in a 50–50 benzene-pentane solution containing about 10%, 2,4-tolylene diisocyanate and about 1%, based on the cyanate, of a catalyst mixture of dibutyl tin oxide and stannous chloride. The beads were expanded in a mold at 125–175° C. for about 30 minutes. The foamed polymer produced good solvent resistance and dimensional stability at elevated temperatures.

Another portion of the above polymer beads was immersed in a similar solution, but containing about 5% pyromellitic dianhydride and a small amount of titanium tetrachloride, employed as crosslinking agent and catalyst respectively. The beads were expanded in a mold at 100 to 180° C. The resulting polymer foam had good dimensional stability at elevated temperatures and good resistance to attack by organic liquids.

Example XII

A copolymer of vinyl chloride (100 parts) and bis(2-tertiarybutoxyethyl) maleate (50 parts) was prepared as in Example XI, in the form of the copolymer beads. A portion of the beads was expanded thermally, without a catalyst, by heating at 120 to 200° C. for about 30 minutes. This material was not completely crosslinked and showed some attack by organic solvents.

Another portion of the beads expanded after soaking in the tolylene diisocyanate solution described in Example XI. The final expanded polymer showed good dimensional stability and resistance to organic solvents.

Example XIII 9.29 grams (0.1 mole) of the monotertiarybutyl ether of glycerine is reacted for about 2 hours with about 0.1 mole of dimethyl terephthalate in the presence of about 0.4 gram of tetra-2-ethylhexyl titanate esterification catalyst at a temperature of about 110 to 160° C. under nitrogen. A viscous polyester is obtained. 0.5 gram of TiCl$_4$ are then added and the mixture is placed in a mold. Upon heating to 200–220° C., a rigid, crosslinked polyester resin foam is obtained.

Procedures as described herein may also be employed to produce copolymer foams from other polymer systems, namely vinyl methyl ether-bis(2-tertiarybutoxy) ethyl maleate copolymers, methyl vinyl ether-tertiary butoxyethyl vinyl ether copolymers, styrene-butadiene-2-tertiarybutoxyethylacrylate terpolymers, 2-tertiarybutoxyethyl acrylate homopolymer, etc. The illustrated procedures are applicable to the formation of foamed polymers from any of the tertiarybutoxyethyl esters or ethers already It is claimed:

1. A method for the preparation of foamed solid polymers from a feedstock comprising a polymer having a molecular weight of at least about 500 and containing cross-linking sites and tertiaryalkoxyalkyl side chains of the type $-(R'O)_x-R^2$ wherein $R'$ is an alkylene radical of 2 to 12 carbon atoms, $R^2$ is a tertiary alkyl radical of 4 to 10 carbon atoms and $x$ is a number from 1 to 5 which comprises heating said feedstock to a temperature of about 50° C. to 350° C. to liberate tertiary olefin gas therefrom and provide hydroxyalkyl groups therein by decomposition of tertiary alkoxyalkyl groups, holding said feedstock at a temperature sufficient to provide a viscosity suitable for foaming at a pressure sufficient to allow expansion of the tertiary olefin gas to form a polymer foam and reacting said hydroxyalkyl groups to cross-link polymer molecules of said polymer.

2. The method of claim 1 in which the polymer feedstock is a vinyl-type polymer consisting essentially of 1 to 100% of the residue of a tertiaryalkoxyalkyl ester of an olefinically unsaturated carboxylic acid in which the acid group is of 3 to 43 carbon atoms, the essential balance of the polymer being the residue of a copolymerizable olefinic hydrocarbon of 2 to 20 carbon atoms.

3. The method of claim 1 in which cross-linking is accomplished by the use of a cross-linking agent having tertiaryalkoxyalkyl radicals which decompose to provide hydroxyalkyl radicals for cross-linking the polymer molecules.

4. The method of claim 1 in which an acid catalyst for decomposition of the tertiaryalkoxyalkyl is included in the feedstock.

5. A method for the preparation of foamed solid polymers which comprises providing a feedstock comprising a vinyl-type polymer having an average molecular weight of at least about 500 consisting essentially of about 1 to 100% by weight of the residue of a tertiaryalkoxyalkyl ester of an olefinic carboxylic acid in which the acid group is of 3 to 43 carbon atoms and in which the tertiary alkoxyalkyl has the formula $-(R^1O)_x-R^2$ where $R^1$ is an alkylene radical of 2 to 12 carbon atoms, $R^2$ is a tertiaryalkyl radical of 4 to 10 carbon atoms, and $x$ is a number from 1 to 5, the essential balance of the polymer being the residue of a copolymerizable olefinic hydrocarbon of about 2 to 20 carbon atoms, heating the feedstock to a temperature of about 50° C. to 300° C. to liberate tertiary olefin gas and provide hydroxyalkyl groups by decomposition of tertiaryalkoxyalkyl groups, holding said feedstock at a temperature sufficient to provide a viscosity suitable for foaming at a pressure sufficient to allow expansion of the tertiary olefin gas to form a polymer foam and reacting said hydroxyalkyl groups with a cross-linknig agent to cross-link polymer molecules.

6. The method of claim 5 in which $R^1$ is of 2 to 8 carbon atoms and $R^2$ is of 4 to 7 carbon atoms.

7. The method of claim 5 in which the ester residue has the formula

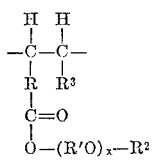

where R is a hydrocarbon radical of 0 to 40 carbon atoms, and $R^3$ is selected from the group consisting of hydrogen and hydrocarbon radicals of 1 to 40 carbon atoms.

8. The method of claim 7 in which $R^3$ is lower alkyl.

9. The method of claim 5 in which the copolymerizable olefinic hydrocarbon is of the type $H_2C=CHX$ where X is selected from the group consisting of halogen, hydrocarbon, cyano, acetyl, hydrogen and methylate.

10. The method of claim 5 in which the polymer feedstock is in bead form.

11. A method for the preparation of foamed solid polymers which comprises heating a feedstock to a temperature of about 50° C. to 350° C. to liberate tertiary olefin gas and provide hydroxyalkyl groups by decomposition of tertiaryalkoxyalkyl groups, holding said feedstock at a temperature sufficient to provide a viscosity of about 50 centipoises to 20,000 poises at a pressure sufficient to allow expansion of the tertiary olefin gas to form a polymer foam and reacting said hydroxyalkyl groups with a cross-linking agent to cross-link polymer molecules, said feedstock comprising a vinyl-type polymer having an average molecular weight of at least about 500 containing 1 to 100% of the residue of the tertiarybutoxyethyl ester of olefinically unsaturated carboxylic acid in which the acid group is of 3 to 12 carbon atoms, the essential balance of the polymer being the residue of an ethylene compound of the type $H_2C=CHX$ where X is selected from the group consisting of halogen, hydrocarbon, cyano, acetyl, hydrogen and methylate.

12. The method of claim 11 in which the polymer feedstock has about 0.01 to 10 parts by weight of the ester residue for each part by weight of the ethylene-type residue.

13. The method of claim 11 in which the acid group is of 3 to 6 carbon atoms.

14. The method of claim 13 in which the polymer has about 15 to 75% by weight of ethylene-type residue.

15. The method of claim 11 in which olefin liberation takes place at a temperature of about 75 to 150° C. in the presence of an acid catalyst.

16. The method of claim 11 in which foaming takes place simultaneously with olefin liberation.

17. The method of claim 11 in which the cross-linking agent has a divalent acid-acting radical.

18. A method for the preparation of foamed solid polymers which comprises providing a feedstock comprising a vinyl-type polymer having an average molecular weight of at least about 500 consisting essentially of about 1 to 100% by weight of the residue of a tertiaryalkoxyalkyl ester of a monoolefinic dicarboxylic acid in which the acid group is of 3 to 12 carbon atoms and in which the tertiaryalkoxyalkyl has the formula $-(R^1O)_x-R^2$ where $R^1$ is an alkylene radical of 2 to 12 carbon atoms, $R^2$ is a tertiaryalkyl radical of 4 to 10 carbon atoms, and $x$ is a number from 1 to 5, the essential balance of the polymer being the residue of a copolymerizable olefinic hydrocarbon of about 2 to 20 carbon atoms, heating said feedstock to a temperature of about 50° C. to 300° C. to liberate tertiary olefin gas and provide hydroxyalkyl groups on said polymer by decomposition of tertiaryalkoxyalkyl groups, holding said feedstock at a temperature sufficient to provide a viscosity suitable for foaming at a pressure sufficient to allow expansion of the tertiary olefin gas to form a polymer foam and reacting said hydroxyalkyl groups with a cross-linking agent to cross-link polymer molecules.

19. A polymer foam of improved dimensional stability consisting essentially of the residues of a polymer having a molecular weight of at least about 500, the polymer being a vinyl-type polymer consisting essentially of 1 to 100% of the residue of a tertiaryalkoxy-alkyl ester of an olefinically unsaturated carboxylic acid in which the acid group is of 3 to 43 carbon atoms, the essential balance of the polymer being the residue of a copolymerizable olefinic hydrocarbon of 2 to 20 carbon atoms, the residues of polymer molecules being cross-linked by a moiety including the radical $-(R'O)_x-$ where $R'$ is a divalent aliphatic hydrocarbon of 2 to 12 carbon atoms and $x$ is a number from 1 to 25.

20. A polymer foam of improved dimensional stability consisting essentially of a polymer having a molecular weight of at least about 500 and comprising 15 to 75% of an ester residue of the formula

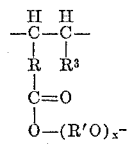

where R is a hydrocarbon radical of 0 to 40 carbon atoms, R' is an aliphatic divalent hydrocarbon radical of 2 to 12 carbon atoms, $R^3$ is selected from the group consisting of hydrogen and hydrocarbon radicals of 1 to 40 carbon atoms and $x$ is 1 to 25 and 85 to 25% of the residue of a copolymerizable olefinic hydrocarbon of about 2 to 20 carbon atoms, —(R'O)$_x$— radicals of polymer molecules being cross-linked by the residues of divalent radicals to provide the dimensional stability.

21. A polymer foam of improved dimensional stability comprising a cross-linked vinyl-type polymer having an average molecular weight of at least about 500 containing 1 to 100% of the residue of an olefinically unsaturated carboxylic acid of 3 to 12 carbon atoms, the essential balance of the polymer being the residue of an ethylene compound of the type $H_2C{=}CHX$ where X is selected from the group consisting of halogen, hydrocarbon, cyano, acetyl, hydrogen and methylate, polymer molecules being cross-linked by glycol residues esterified to said acid residues.

22. The method of claim 18 in which the ester is a diester and the ester residue has the formula

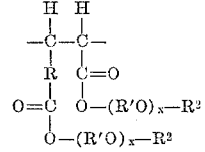

wherein R is a hydrocarbon radical of 0 to 9 carbon atoms.

23. The method of claim 22 wherein R' is of 2 to 8 carbon atoms and $R^2$ is of 4 to 7 carbon atoms.

References Cited

UNITED STATES PATENTS 3,044,970   7/1962   Baumeister et al. _____ 260—2.5

MURRAY TILLMAN, *Primary Examiner.*

M. FOELAK, N. F. OBLON, *Assistant Examiners.*